Oct. 18, 1960  F. G. DE BRIE PERRY  2,956,441
INFINITELY VARIABLE CHANGE SPEED GEARS
Filed Sept. 9, 1957
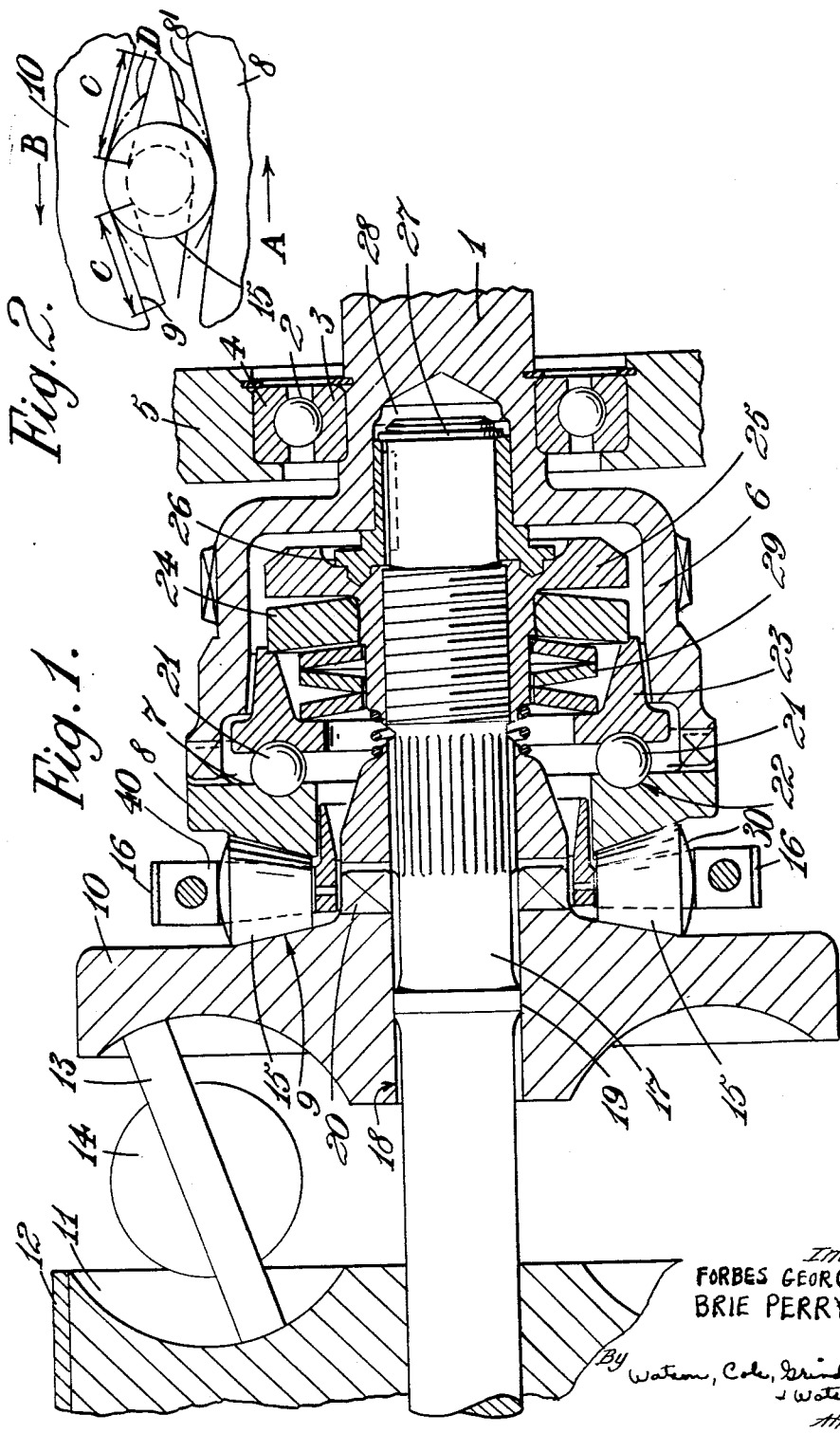
Inventor
FORBES GEORGE DE BRIE PERRY
By Watson, Cole, Grindle
& Watson
Attorneys United States Patent Office 2,956,441
Patented Oct. 18, 1960

2,956,441

INFINITELY VARIABLE CHANGE SPEED GEARS

Forbes George de Brie Perry, Felbridge, near East Grinstead, England, assignor to Perbury Engineering Limited, Sussex, England, a British company Filed Sept. 9, 1957, Ser. No. 682,719

Claims priority, application Great Britain Sept. 11, 1956

5 Claims. (Cl. 74—200)

This invention relates to infinitely variable change speed gears of the type having coaxial first and second torus discs connected by rollers which are rocked to vary the speed ratio of transmission, in which rocking of the rollers is effected automatically by precession and in which means is employed for generating frictional engaging pressure between the rollers and the torus disc faces, which increases with the load on the input shaft to the gear. A gear of this type is referred to later herein as "a gear of the type hereinbefore described."

The frictional engaging pressure is obtained by compressing the rollers between the opposing faces of the two torus discs and, in a practical embodiment of a gear of the type hereinbefore described, the input torque imposes an axial load on the disc and roller system by means of a cam device which produces the axial thrust by relative axial rotation of driving and driven parts.

If any small self-alignment of the gear, due to geometrical inaccuracy, has to be accommodated under operational load by axial separation of the two torus discs, very high axial forces are generated. These forces can be relieved only by extension of the shaft on which one or other of the torus discs is mounted, physical compression of the discs, rollers and cam device or enforced backward relative rotation of the cam parts. By the first two effects, the loading is quite sufficient to damage the contact surfaces between the rollers and the torus disc faces. The third effect may not be possible because of the setting of the cam.

The object of the present invention is to provide a new and improved infinitely variable change speed gear of the type hereinbefore described comprising means for relieving the axial forces which may be produced, without relying on the effects mentioned above.

According to the present invention, an infinitely variable change speed gear of the type hereinbefore described has at least one axially resilient member interposed between one of the torus discs and the shaft on which the disc is carried.

In an arrangement in which one torus disc is fixed against axial movement and the other torus disc is moved axially along the shaft on which it is mounted, under action of a cam device, to provide the engaging pressure between the rollers and the torus disc faces, the axially resilient member or members are conveniently interposed between the driving member of the cam device and the said shaft.

In one embodiment a single axially resilient member is provided, the resilient member being in the form of a dished washer or Belleville spring which washer or spring is so dimensioned that its axial resiliency extends beyond the upper limit of the axial loading for which the gear is designed. Alternatively, however, two axially resilient members may be provided each of said members being in the form of a dished washer or Belleville spring, and in this case the washers or springs are so dimensioned that their total axial resiliency extends beyond the upper limit of the axial loading for which the gear is designed.

The Hayes gear is a practical form of gear of the type hereinbefore described and has an input shaft which drives a pair of inwardly-facing first torus discs axially spaced about a double, outwardly-facing second torus disc connected by a drum to an output shaft. Two assemblies of rollers, roller carriers and rocker gear are provided, one between each face of the double torus disc and each of the torus discs driven from the input shaft. Frictional engaging pressure between the torus discs and the connecting rollers is created by a cam device which moves one of the inwardly-facing first torus discs towards the other, according to the load transferred to the input shaft, thereby compressing the double torus disc and the two sets of rollers between the outer torus disc.

According to the invention, in a Hayes gear, that is to say a gear in the form last described above, the two inwardly-facing first torus discs are carried on a drive shaft, one of the said first torus discs being fixed against axial movement relatively to the drive shaft and the other first torus disc and the second torus disc being permitted limited axial movement relatively to the drive shaft, relative axial movement between the said other first torus disc and the drive shaft is produced by a cam arrangement having a driving member connected to the input shaft and a driven member connected to the first torus disc, and the axially resilient member is located between one part of a thrust bearing retaining the cam driving member and a flanged nut fixed against axial movement relatively to the drive shaft.

An embodiment of the invention will now be described, by way of example, with reference to the accompanying drawings of which:

Figure 1 is a longitudinal sectional view of a part of a Hayes gear, and

Figure 2 is a diagram referred to in the description of the cam device shown in Figure 1.

In the gear of Figure 1, an input shaft 1 is supported at the gear end by a bearing 2 having its inner race 3 mounted on the input shaft 1 and its outer race 4 carried in an inwardly extending flange of a casing 5, which extends coaxially with the gear enclosing the gear parts.

The gear end of the input shaft 1 is formed as a drum 6 terminated in dogs 7 to which the driving member 8 of a cam device is dogged. The driving member 8 is provided with an axial cam face, a co-operating and facing cam face being formed on the face 9 of a torus disc 10 which forms the driven member of the cam device. The torus disc 10 is one of a pair of inwardly facing torus discs axially spaced about a double, outwardly-facing second torus disc 11, connected by a drum 12 to an output shaft, not shown.

Two assemblies of rollers, roller carriers and rocker gears are provided, one between each face of the double torus disc 11 and each of the first torus discs 10. One roller 13 and its associated roller carrier 14 are shown in the drawing; the roller 13 and roller carrier 14 are one of three rollers and carriers of one of the two assemblies, each roller 13 being radially spaced by 120° about the drive shaft axis.

The driving member 8 and the driven member 10 of the cam device are connected by a number of cam following rollers of which one is shown at 15. These rollers 15 are restrained from radial movement by bearing of curved faces 30 on cage 16.

The torus disc 10 is carried on a drive shaft 17, the inner face 18 of the disc resting on a land 19 formed on the shaft. The torus disc 10 is rotationally fixed to the drive shaft 17 by dogs shown at 20; however, the torus disc 10 is free to make limited axial movement relatively to the shaft 17 and therefore the casing 5, the shaft itself being fixed against axial movement.

The driving member 8 of the cam device is retained by a thrust bearing 21 one race 22 of which is machined on the opposite face of the driving member 8 from the cam face and the other race 23 of which bears against one face of a dished washer or Belleville spring 24. The other face of the Belleville spring 24 bears against the flange of nut 25 mounted on the drive shaft 17 and fixed against axial movement relatively to the drive shaft 17. It will be seen therefore that the spring 24 is, effectively, interposed between the disc 10 and the casing 5. A flanged bearing 26 is keyed on the input end of the drive shaft 17 and locks the flanged nut 25. The bearing 26 is retained by a circular spring clip 27, and provides a bearing surface with the inner surface of a recess 28 formed in the gear end of the input shaft 1, wherein the input end of the drive shaft 17 is retained.

Further Belleville springs 29 interposed between the race 23 and a step in the unit 25 provide the desired initial axial loading of the roller system. It will be appreciated that like the spring 24, the springs 29 are also, effectively, interposed between the disc 10 and the casing 5, and consequently load the disc 10 towards the other inwardly facing torus disc. When the gear is assembled, flanged nut 25 is screwed on to the drive shaft 17 compressing the Belleville springs 29 until the outer edge of the Belleville spring 24 abuts against the face of the member 23 of the thrust bearing 21. Beyond this position, further compression of the Belleville springs 29 is possible only by compressing also the Belleville spring 24. The setting of the flanged nut 25 for this initial axial loading of the roller system is thus easily determined since the resistance of the spring 29 will easily be felt, upon which the flanged nut 25 is locked by the flanged bearing 26.

Figure 2 is a diagram of the cam device representing a developed view of the driving and driven members and connecting roller in the direction of the roller axis towards the drive shaft axis. The parts shown are correspondingly referenced as in Figure 1.

Assuming that the driving member 8 is rotated in the direction of the arrow A, the driven member 10 will be rotated in the same direction. However, the reaction of the output load will tend to rotate the driven member 10 in the direction of the arrow B. Consequently, relative rotation will occur between the two members, the cam roller 15 producing a thrust against the cam faces tending to separate the driving and driven members.

The opposing cam faces 9 and 8' each comprise a linear portion, serving for relative movement in either direction, separated by a transition portion. The linear portion of the cam tracks is in each case shown at C. The intermediate transition curves are indicated at D.

The thrust produced is transferred through the thrust bearing 21 and the flange of nut 25 to the drive shaft 17 to which the other first torus disc, not shown in the drawings, is fixed against axial movement. The thrust is thus developed between the faces of the first torus discs and tends to compress the rollers between these faces and the second torus disc.

In the event of any small self-alignment of the gear giving rise to axial separation of the first torus discs, the required movement is taken up by axial flexing of the Belleville spring 24, and only a relatively small and tolerable increase in axial load is placed upon the parts of the gear.

The member 23 of the thrust bearing 21 can align itself radially by virtue of radial clearance over the Belleville spring 24 and angular alignment of this member is accommodated by differential flexing of the Belleville spring 24.

In a modification a second Belleville spring 24 may be provided between the spring 24 illustrated in Figure 1 and the flange of the nut 25, the second spring being arranged as a lateral inversion of the first spring, the second spring having an inner radial edge engaging the first spring and an outer radial edge engaging the flange.

In the case where a single Belleville spring 24 is provided, this is so dimensioned that its axial resiliency extends beyond the upper limit of the axial loading for which the gear is designed. Where two Belleville springs are provided the springs are so dimensioned that their total resiliency extends beyond the upper limit of the axial loading for which the gear is designed. To this end it will be appreciated that the spring or springs 24 must be of high rate compared with the springs 29.

I claim:

1. Means for relieving axial forces produced in an infinitely variable change speed gear of the type having a casing and co-axial torus discs, connected by rollers which are rocked to vary the speed ratio of transmission, one of said torus discs being free to perform axial movement relative to said casing, which means comprises axially resilient means effectively interposed and held compressed between said one of said torus discs and said casing and providing a desired initial axial loading on said one torus disc, and a resilient conical washer effectively interposed between said one of said torus discs and said casing to act on the said one of the torus discs independently of the axially resilient means, said resilient conical washer being of high rate in relation to said axially resilient means and having an axial resiliency greater than the maximum axial loading for which the gear is designed.

2. Means for relieving axial forces in an infinitely variable change speed gear of the kind having torus discs and interposed rollers comprising, in combination, a casing for said gear, a bore in said casing, a ball bearing mounted in said bore and having an outer race connected to said casing and an inner race, an input shaft carried by said inner race, an axial bore in said input shaft, a flanged bearing having a cylindrical portion received within said axial bore and a flange, a drive shaft keyed to said bearing, a circular spring clip received within a groove in said drive shaft and restraining said bearing against axial movement toward said input shaft, a thread on said drive shaft, a nut screwed on said thread and having a flange abutting against said flange of said bearing remote from said input shaft, and locked thereby, said nut having a cylindrical portion, a resilient conical washer surrounding said cylindrical portion of said nut and abutting said flange of said nut at its apex end, said conical washer having an axial resilience greater than the maximum axial loading for which the gear is designed, a thrust bearing having a first thrust race and a second thrust race, said first thrust race abutting said conical washer at its base end, a pack of Belleville springs abutting between said nut and said first thrust race to transmit load therebetween, said pack of Belleville springs having a lower rate than said conical washer, a drive connection between said second thrust race and said input shaft, which drive connection is of a kind permitting limited axial movement between said second thrust race and said input shaft, a torus disc of said gear rotationally fixed on said drive shaft, and a cam device between said second thrust race and said torus disc, which cam device comprises driving cam faces on said second thrust race, driven cam faces on said torus disc and rollers between said driving and driven cam faces.

3. Means for relieving axial forces produced in an infinitely variable change speed gear of the type having a casing and co-axial torus discs, connected by rollers which are rocked to vary the speed ratio of transmission, one of said torus discs being free to perform axial movement and limited rocking movement relative to said casing, which means comprises axially resilient means effectively interposed and held compressed between said one of said torus discs and said casing and providing a desired initial axial loading on said one torus disc, and a resilient conical washer effectively interposed between said one of said torus discs and said casing to act on the said one of the torus discs independently of the axially resilient means, said resilient conical washer being of high rate in relation to said axially resilient means and having an axial resiliency greater than the maximum axial loading for which the gear is designed.

4. Means as claimed in claim 3 wherein said one of the torus discs is slidably carried on a shaft and held against axial movement relative to the casing, said shaft having a peripheral ridge on which the torus disc is supported so as to be able to rock on said ridge relative to the shaft.

5. Means for relieving axial forces in an infinitely variable change speed gear of the kind having torus discs and interposed rollers comprising, in combination, a casing for said gear, an input shaft journalled in the casing, a drive shaft co-axial with the input shaft, a nut screwed on to the drive shaft, said nut having a cylindrical portion and a flange, a resilient conical washer having a base end and an apex end and surrounding said cylindrical portion, said apex end butting said flange, said conical washer having an axial resilience greater than the maximum axial loading for which the gear is designed, a thrust bearing having a first thrust race and a second thrust race, the base end of said conical washer abutting said first thrust race, and a plurality of Belleville springs abutting between said nut and said first thrust race to transmit load therebetween, said plurality of Belleville springs having a lower resilience than said conical washer, said second thrust race and said input shaft defining a drive connection, which drive connection permits limited axial movement between said second thrust race and said input shaft.

References Cited in the file of this patent

UNITED STATES PATENTS

| 2,112,763 | Cloudsley | Mar. 29, 1938 |
| 2,140,012 | Hayes | Dec. 13, 1938 |
| 2,239,087 | Erban | Apr. 22, 1941 |
| 2,445,066 | Hayes | July 13, 1948 |
| 2,730,904 | Rennerfelt | Jan. 17, 1956 |